United States Patent Office 3,302,887
Patented Feb. 7, 1967

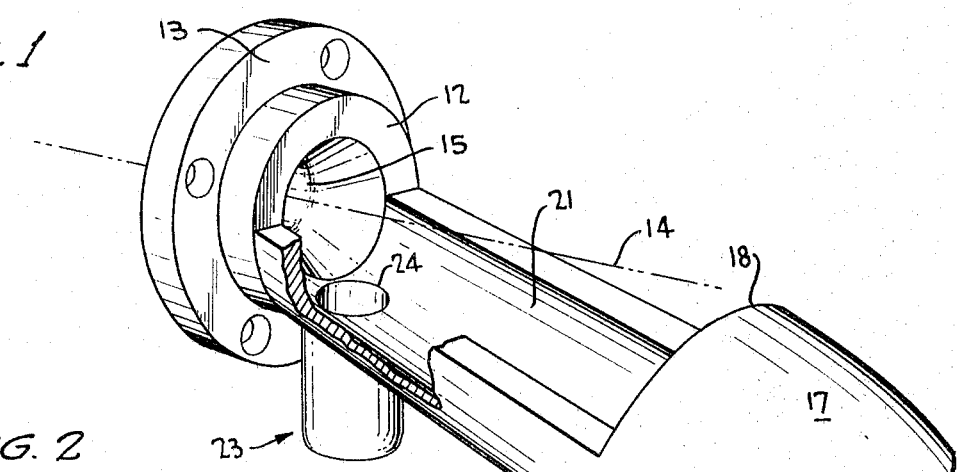
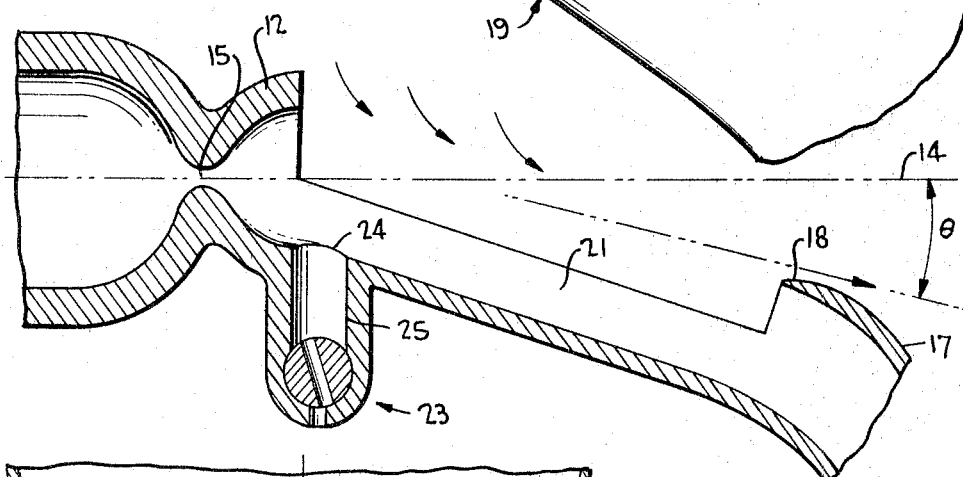
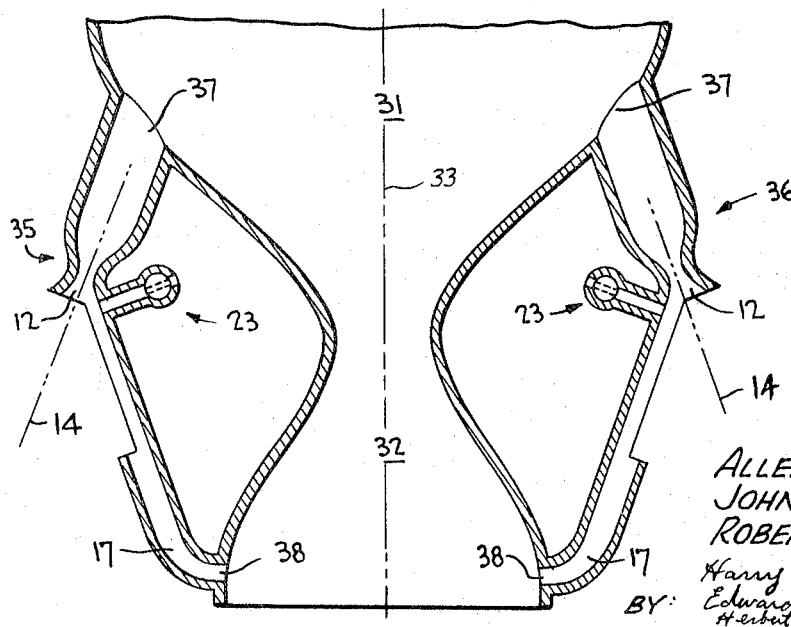

3,302,887
MODULATING FLUID AMPLIFIER CONTROL VALVE
Allen B. Holmes, Silver Spring, Md., John E. Foxwell, Washington, D.C., and Robert F. Kreimeyer, North Chevy Chase, Md., assignors to the United States of America as represented by the Secretary of the Army
Filed Mar. 17, 1964, Ser. No. 352,695
9 Claims. (Cl. 239—265.23)

The invention described herein may be manufactured and used by or for the Government of the United States of America for governmental purposes without the payment of any royalties thereon or therefor.

This invention relates to supersonic, three dimensional fluid amplifiers, and more particularly to a fluid amplifier thrust vector control system for reaction jet engines.

One way to steer or control jet-propelled vehicles is thrust vector control. Basically, thrust vector control means control by deflection of the main propulsion jet, and one way to do this is by secondary fluid injection. That is, an auxiliary fluid is injected into the main reaction jet nozzle, causing the main propulsion jet to deflect. A few specific examples of this system may be found in the patents to A. E. Wetherbee, Jr., Patent No. 2,943,821; N. K. Walker, Patent No. 2,916,873; and M. Kadosch et al., Patent No. 2,812,636.

To get good control of a reaction jet engine by means of secondary injection thrust vectoring, it is necessary to have available at each secondary injection nozzle about 6% of the main reaction jet thrust. This amount of fluid is necessary to give quick response under full control conditions.

Very often, in prior systems, the secondary injection fluid is an auxiliary fluid, carried separately, specially for control purposes. While in many applications this system is satisfactory, there is a sacrifice of overall engine efficiency because of the increased non-thrust-producing weight.

An inherently more attractive system is to bleed the reaction products from the combustion chamber of the engine and use them as the secondary injection fluid. With this system no auxiliary control fluid is needed, and overall efficiency and performance are enhanced. But bleed system proposals have been around for a number of years—their advantages are obvious—yet as far as applicants are aware no really satisfactory system is available. The problem lies in controlling the hot-gas, high-velocity, reaction products from the combustion chamber with the precision required for thrust vector control.

One object of this invention is to provide a three-dimensional, supersonic, proportional control, fluid amplifier capable of controlling reaction jet combustion products.

Another object of this invention is to provide a combustion chamber-bleed secondary-injection thrust vector control system for reaction jet engines operating within the earth's atmosphere.

A further object of this invention is to provide a thrust vector reaction jet control system using fluid bleed from the combustion chamber to vector the jet, and which has no moving parts in the hot gas paths.

One further object of this invention is to a reaction chamber bleed, thrust vector control system which has continuous proportional control of the injection gas from full on to full off.

An additional object of this invention is to achieve the above stated objects efficiently. That is, the ratio: pounds of thrust generated by the engine to pounds of propellant flow is close to unity.

These and other objects of this invention are accomplished by means of applicants' novel one-leg fluid amplifier control system. This system includes a supersonic jet-forming nozzle with its flow axis uninhibited so that the full reaction thrust of the nozzle may be developed. Displaced from and on one side of the main jet flow axis is a splitter and fluid catcher channel. On the same side of the jet axis are means to proportionately control the amount of entrainment of the jet formed by the supersonic nozzle. The proportionate control means has no moving parts in the hot gas jet stream, but by controlling the amount of entrainment controls the amount of fluid which impinges upon the splitter and is directed into the catcher channel.

FIG. 1 is a perspective view of a one-leg, three-dimensional, supersonic fluid amplifier of this invention.

FIG. 2 is a sectional schematic view of an amplifier of this invention.

FIG. 3 is a schematic view of a thrust vector control system of this invention.

FIG. 1 shows a secondary injection control system which includes a converging-diverging nozzle 12 having a mounting flange 13 for attachment to a reaction chamber bleed port. The nozzle 12 has an orifice 15 with a principal jet thrust axis along the line 14.

Located downstream from the nozzle orifice 15 is a splitter 18. The splitter 18 is located to one side of the principal thrust axis 14 far enough that virtually none of the jet stream issuing from nozzle 12 impinges upon the splitter 18 in the absence of a control signal.

On the same side of the principal thrust axis 14 as the splitter 18 is a fixed system 19 for proportionately controlling the amount of fluid jet stream directed into the channel 17. The fixed system 19 includes a channel 21 extending out from the diverging portion of the nozzle 12. As is shown more clearly in FIG. 2, where the same reference numerals are used to identify like parts, there is a control port 24 in the channel 21 closely adjacent to the nozzle 12. Separated from the port 24 by a channel 25 is an entrainment control valve 23. By limiting the amount of air flow through the valve 23, the jet stream will be deflected from the axis 14 toward the splitter 18. That is, as the valve 23 is gradually closed, limiting the amount of air supplied to port 24, the jet stream from nozzle 12 is proportionately directed toward the splitter 18 and fluid enters the channel 17. With the valve 23 closed, substantially the entire jet stream is directed into the channel 17.

The mechanism of operation of the fluid amplifier system shown in FIGS. 1 and 2 can be described by the Coanda effect. As pointed out by Henri Coanda in U.S. Patent No. 2,052,869, when a fluid jet issues through a suitable nozzle into another fluid, such as air, it will carry along with it a portion of the surrounding fluid if its velocity is sufficient. That is, the jet will create a suction effect on the surrounding fluid at the point of discharge from the nozzle. If, at the outlet of the fluid jet, there is set up an unbalancing effect on the flow of surrounding air induced by the jet, the jet will move towards the side on which the flow of the surrounding fluid has been made more difficult. In the embodiment of this invention shown in FIGS. 1 and 2, these principles are applied in three dimensions. Channel 21 is rigidly attached to the nozzle 12, and the side walls of the channel 21 are of sufficient upward extent to prevent entrainment in a lateral direction, which gives control of the amount of entrainment of the surrounding fluid induced by the jet from nozzle 12 to the valve 23. With the valve 23 closed, or partially closed, there will be an excess pressure on the jet flowing from nozzle 12 on the side away from splitter 18 due to the atmospheric pressure on that side of the jet; the restricted entrainment lowers the pressure below atmoisture on the other side. The unbalance in pressure directs the jet toward the splitter 18.

The jet issuing from nozzle 12 will have a supersonic velocity when the pressure ratio across the nozzle 12 is greater than 2. This pressure ratio will, of course, be present when the fluid is supplied from the combustion chamber of a reaction jet engine. A supersonic jet will induce a large amount of entrainment of the surrounding air, and this high entrainment characteristic will give a high degree of control to the valve 23.

The offset of the splitter 18 from the thrust axis 14, and its distance from the nozzle 12, are primarily determined by the charactristics of the jet issuing from nozzle 12, which in turn is determined by the nozzle design and the supply fluid characteristics. That is, the offset should be sufficient that no fluid impinges on the splitter 18 when valve 23 is open, and close enough to the nozzle 12 that the jet stream is still moving at supersonic velocity when it enters the channel 17. Both of these criteria may be easily met in practice.

FIG. 3 shows the control system of this invention applied to control a reaction jet engine. The reaction jet engine has a combustion chamber 31 with a converging-diverging power nozzle 32. The principal thrust axis of the engine is along the axis 33. To control the jet engine and the vehicle which it powers, there are thrust vector control systems 35 and 36. While only two systems are shown, it will be obvious to skilled persons that an actual system would normally employ four units—one unit for each direction—in order to achieve three-dimensional control. The broad function of the control systems 35 and 36, which are identical, is to bleed a portion of the reaction products from the combustion chamber 31 through ports 37 and inject a controlled amount, on demand, into the main reaction nozzle 32 through thrust vectoring nozzles 38. In order to achieve good control it is usually necessary that about 6% of the main rocket thrust, in pounds, be available at each control nozzle. This requires that each control system, such as 35 or 36, be capable of channeling a significant amount of fluid to the secondary control nozzles under full control conditions.

In order that the thrust vector control systems 35 and 36 be efficient, the auxiliary control nozzles 12 have their principal thrust axis substantially parallel to the main rocket thrust axis 33. In FIG. 3, the axes 14 are actually inclined slightly with respect to the axis 33 in order that the control system thrust axes 14 pass through the center of gravity of the engine so that the control system does not create a turning moment on the engine. This is not absolutely necessary, since as is apparent, if the units 35 and 36 are balanced, even though the thrust axes 14 are parallel to axis 33, the turning moment will cancel.

With no control, substantially the full forward thrust of the engine is developed in the main jet nozzle 32 and the auxiliary control nozzles 12. When it is desired to thrust vector the principal engine jet issuing from nozzle 32, one of the valves 23 (for example of system 36) is closed in an amount proportional to the distance the main jet is to be directed away from its axis 33. With the valve 23 partially closed, part of the jet stream from nozzle 12 is directed into the catcher 17 and issues from thrust control nozzle 38, while the remainder of the jet stream is directed substantially along the main thrust axis 33, providing propulsion power.

As will be apparent to those skilled in the art, applicants have provided an efficient thrust vector control system which can provide continuous proportionate control of the main thrust jet, and does not require moving parts in any hot gas path. This last point, in terms of the present state of the art, in combination with the high thrust recovery of the system in the absence of a control signal, makes this system practical and operative.

The gain of applicants' fluid amplifier system can most significantly be measured in terms of flow. That is, the ratio of control flow and change in pressure through valve 23 to the change in fluid jet flow and pressure through conduit 17. Gains on the order of 10,000 have been realized with systems of the type described.

It will be apparent that the embodiments shown are only exemplary and that various modifications can be made in construction and arrangement within the scope of the invention as defined in the appended claims.

We claim as our invention:

1. A three-dimensional, hot-gas, proportional control, supersonic, fluid amplifier comprising:
   (a) a power jet nozzle for forming a high velocity power jet, said high velocity power jet issuing from said power nozzle having a principal axis,
   (b) a power jet formed by said nozzle being unobstructed along said principal axis,
   (c) a splitter located wholly on one side of said principal axis and out of the path of said jet,
   (d) control port means for varying the amount of surrounding fluid entrained by said jet, said control port means being located on the same side of said axis that said splitter is located, said jet being deflected to impinge on said splitter in an amount inversely proportional to the amount of said fluid entrained, and
   (e) a fluid conducting channel, said splitter, directing a portion of said jet impinging on said splitter into said channel.

2. A three-dimensional, hot-gas, proportional control, supersonic, fluid amplifier as in claim 1, wherein said means to control the entrainment includes a channel rigidly attached to said nozzle, said channel having a port adjacent to said nozzle, an entrainment channel connected to said port, and a valve located in said entrainment channel away from said port to control the flow of entrained air to said port.

3. A three-dimensional, hot-gas, proportional control, supersonic, fluid amplifier as in claim 2, wherein said fluid conduction channel is continuous with said splitter and said channel.

4. A secondary injection thrust vector control system for use with a reaction jet engine which has a combustion chamber, and a main reaction jet nozzle with a principal thrust axis, comprising:
   (a) a bleed connected to said combustion chamber,
   (b) said bleed supplying fluid to an auxiliary control nozzle, said control nozzle having a principal thrust axis that is unobstructed,
   (c) a splitter located wholly on one side of said control nozzle axis, and a signal conduit continuous with said splitter, said signal conduit leading to an injection nozzle in said main reaction jet nozzle,
   (d) control port means on said one side of said control nozzle axis for varying the amount of surrounding fluid entrained by the power jet formed by said control nozzle, whereby a differential pressure is created across said jet thereby causing said jet to be directed into said conduit, (e) said differential pressure being inversely proportional to the amount of said fluid entrained by said jet.

5. A secondary injection control system as in claim 4, wherein said means to limit entrainment includes a channel rigidly attached to said nozzle, said channel having a port adjacent to said nozzle, an entrainment channel connected to said port, and a valve located in said entrainment channel away from said port to control the flow of air to said port.

6. A three-dimensional, hot-gas, proportional control, supersonic, fluid amplifier as in claim 1, wherein said power nozzle is a converging-diverging nozzle.

7. A secondary injection control system as in claim 4, wherein said auxiliary control nozzle is a converging diverging nozzle.

8. A secondary injection control system as in claim 4, wherein said principal thrust axis of said auxiliary control nozzle is substantially parallel to said main reaction jet principal thrust axis.

9. A secondary injection control system as in claim 7, wherein said principal thrust axis of said auxiliary control nozzle is substantially parallel to said main reaction jet principal thrust axis.

References Cited by the Examiner
UNITED STATES PATENTS

| | | | |
|---|---|---|---|
| 2,812,980 | 11/1957 | Kadosch et al. | 60—35.54 X |
| 3,036,430 | 5/1962 | Eggers et al. | 60—35.54 |
| 3,132,478 | 5/1964 | Thielman | 60—35.54 |

CARLTON R. CROYLE, *Primary Examiner.*

BENJAMIN A. BORCHELT, *Examiner.*

R. V. LOTTMANN, V. R. PENDEGRASS,
*Assistant Examiners.*